March 11, 1958     S. K. WOOD     2,826,250
PARKING TIMING METER
Filed Jan. 4, 1954                                       2 Sheets-Sheet 1
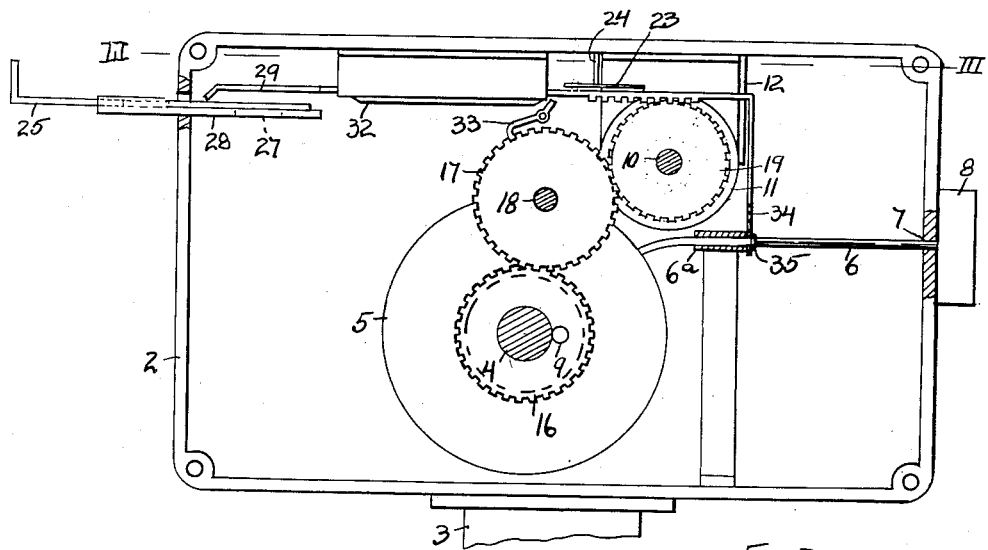
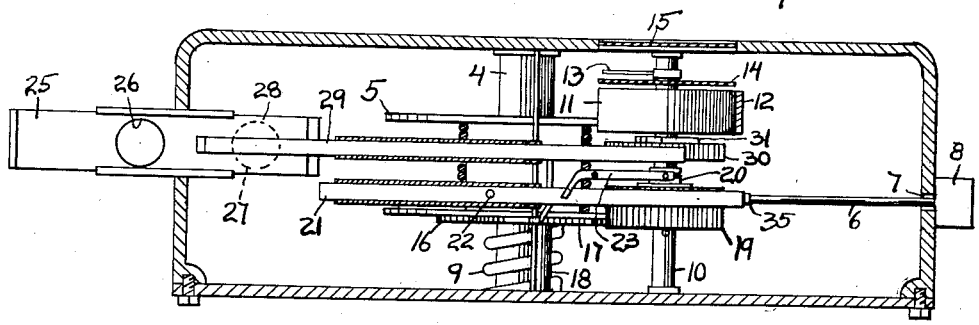
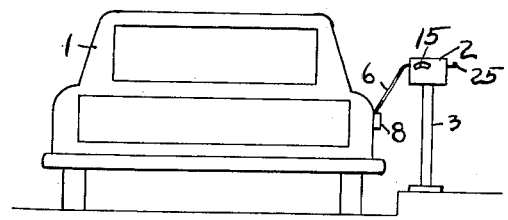
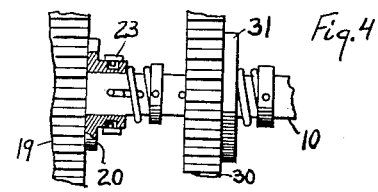
INVENTOR.
Stroud K. Wood
BY Kenneth M. Thorpe
atty.

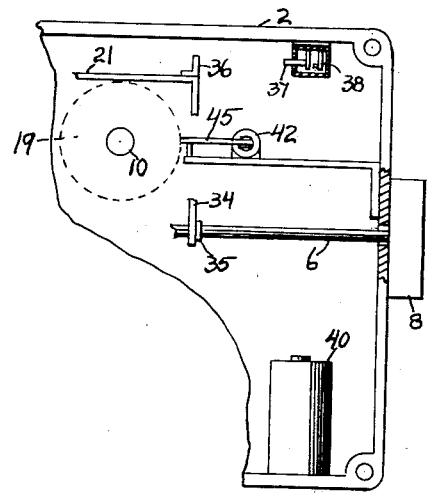
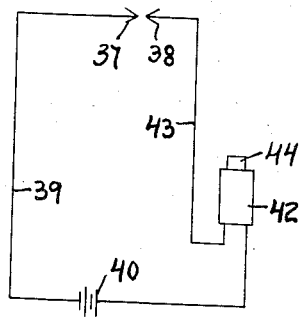
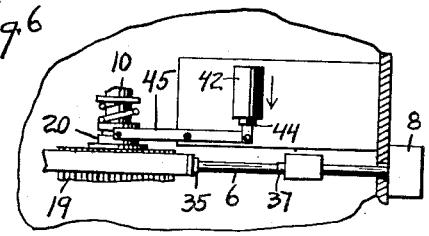

United States Patent Office 2,826,250
Patented Mar. 11, 1958

2,826,250

PARKING TIMING METER

Straud K. Wood, Hutchinson, Kans.

Application January 4, 1954, Serial No. 402,097

3 Claims. (Cl. 161—15)

This invention relates to parking timing meters and the chief object of the invention is to produce a construction in which the removal of a car from a parking stall prior to elapse of paid for time will zero set the meter so that a later comer cannot utilize any unelapsed time, such zero setting being accomplished without the necessity of excavating or altering the street or curbing for the installation of electrical or mechanical equipment.

A number of zero set devices have been devised but as far as I am aware all of them required pavement or curb installations which are expensive and require considerable maintenance. The objects of my invention are accomplished by a simple cord or cable, unrolled from the parking meter and temporarily attached to the parked car as by a permanent magnet, a clamp or otherwise.

With the general objects named in view and others as will hereinafter appear, the invention consists in certain new and useful features of construction and organization of parts as hereinafter described and claimed; and in order that it may be fully understood, reference is to be had to the accompanying drawings, in which:

Figure 1 is a view of the car parked in operative relation to a meter embodying the invention.

Figure 2 is a side view of the meter with the cable enrolled within the meter head.

Figure 3 is a section on the line III—III of Figure 2.

Figure 4 is an enlarged side view of the clutch mechanism.

Figure 5 is a fragmental view of an electrically operated construction.

Figure 6 is a top plan view of the construction shown in Figure 5.

Figure 7 is an electrical diagram showing the connections used in Figures 5 and 6.

In the said drawing, where like reference characters identify corresponding parts in all of the figures, 1 is an automobile parked in close proximity to a meter head or housing 2 carried by a post 3. Journaled on a shaft 4 which is supported at its ends in the housing 2, is a cable reel 5 on which a flexible cable 6 is enrolled. The free end of the cable extends through a tubular guide 6a mounted within the housing 2 and passes outwardly through an opening 7 in the meter head, the arrangement being such that the cable between the guide 6 and the wall of the meter is held in a straight line for a purpose which will hereinafter appear. The end of the cable outside the meter head is equipped with any suitable means for attachment to a motor car, such as a permanent magnet 8. The reel 5 is actuated by a spring 9 to wind up the cable when the latter is not restrained by being attached to a car.

A timing clock shaft 10 is journaled at its ends in the side walls of the head 2, said shaft being actuated by a spring mechanism of any suitable type within a casing 11 carried by a plate 12 depending from the top wall of the meter head. As the timing clock shaft 10 rotates to register elapsed time such time lapse is indicated by a pointer 13 as it moves over a dial 14 visible through a window 15 in the meter head 2.

The construction is such that a car operator must deposit a coin before the cable 6 can be unwound to wind or set the clock mechanism, and for this purpose a gear 16 is keyed to the reel 5, said gear being connected through an idler gear 17 rotatable on a stub shaft 18 to a gear 19 freely journaled on the clock shaft 10. Normally freely journaled gear 19 is clutched to the clock shaft 10 by means of a spring advanced clutch mechanism 20 keyed to and sliding on the shaft 10. As the cable is manually unwound so that its end may be secured to a parked car, a clutch rack bar 21 enmeshed with the gear 19 is moved to the right in Figure 2, so that as the cable is pulled gear 19 is connected by clutch 20 to drive clock shaft 10 to wind the clock and just as the clock spring is fully wound, a pin 22 on the rack bar strikes an actuating lever 23 pivoted on a pin 24 carried by the casing 2, to declutch spring-advanced clutch 20 and release gear 19 from the clock shaft 10 so that said shaft 10, being free, is driven in the reverse direction by the clock spring in the casing 11, the rack bar 21 at the same time coming to the end of its teeth and riding freely on top of gear 19 so that the cable 6 can be unwound a sufficient distance for attachment to a motor car.

The cable reel 5 is locked against pull-out to wind the clock timing mechanism, until the coin has been deposited in the meter. One type of mechanism for this purpose is shown, in which, 25 is a slide plate having a coin receiving opening 26, the coin in said opening being discharged through an opening 27 in a supporting plate 28 when the slide plate has been actuated to release the cable reel 5. The coin is thicker than the plate 25 and as said coin is moved into the meter head it strikes the end of a rack bar 29 which is enmeshed with a gear wheel 30 freely journaled on the clock shaft 10. The gear wheel 30 is connected by a friction clutch 31 to the clock shaft 10, the tension on the clutch being less than the resistance of the clock spring, so that movement of gear 30 will not wind the clock, but reverse movement of the clock shaft 10 will reset said bar 29 to position for coin actuation.

The rack bar 29 is formed with a depending cam 32 which strikes and actuates one end of a pawl lever 33 whose other end is in locking engagement with the idler gear 17 of the clock winding gear train. With this arrangement, it will be apparent that the cable reel 5 is ordinarily locked against pull on the cable 6, until the pawl 33 has been disengaged from gear 17 through coin operation as described above.

With the arrangement heretofore described it will be evident that when the cable 6 is pulled out the clock is wound and immediately starts to register elapsed time on the register. Of course, the spring in the clock is designed to fully unwind or "zero set" after the passage of a predetermined time interval. If the car overstays the time limit, as the cable 6 is declutched from clock shaft 10 by the fact that lever 23 held by pin 22 on rack bar 21, is holding clutch 20 open, it will be evident that the clock mechanism is freely driven by its spring and will unwind in due time or return to "zero set" or wipe out all paid for time. On the other hand, if the car is moved before elapse of all of the paid-for time, it is desirable to have the meter immediately move to "zero set" position to wipe out all time, so that a later comer cannot benefit from any time remaining on the meter, but must deposit another coin. In order to accomplish this result, the cable 6 passes through a guide arm 34 on the end of the rack bar 21 and said cable is formed with a stop button or swedged member 35 so that when said stop strikes the arm 34 it will move the rack bar 21 to the left in Figure 2, reengages the rack bar 21 with gear 19, moves pin 22 away from lever 23 to permit closing of clutch 20. This action connects gear 19 to drive the clock shaft 10. As the spring 9 is more powerful than the clock spring, the tension in spring 9 speeds up unwinding of the clock spring to return the timing mechanism to normal or "zero set" the meter. With this arrangement it will be noted that the cable 6 can be used to wind the clock only by permitting it to return into the meter head a sufficient distance to reengage the clutch and when this reengagement occurs, the cable is locked against withdrawal except by deposit of another coin to unlock the gear train.

It is to be noted that if a car should overstay the paid for time, the cable will be locked out of the meter head because the pawl 33 will have relocked the mechanism to prevent rewinding of the clock without a coin deposit. Under these conditions it will be apparent that the deposit of a coin will release the cable gear train and the power of the spring 9 will overcome the friction of clutch 20 against the dead stop position of the clock, and will rewind the cable on the reel 5. A direction plate will be attached to the head instructing the operator to deposit a coin and then pull out on the cable and attach same to the car. The deposit of the coin will not rewind the clock, consequently there is no danger of the operator failing to pull out the cable, since he will observe that no paid for time will appear on the meter until the cord or cable is extended.

Under some conditions it may be desired to operate the device with electrical rather than mechanical means. By way of example, one means of operating the device is shown in Figures 5, 6 and 7, in which the rack bar 21 is provided with an upstanding lug 36, which is adapted to move a spring switch arm 37 into electric contact with a terminal 38 when the cable 6 has been withdrawn from the reel. Closing the circuit completes a current through wire 39, a battery 40, wire 41, electromagnet 42 and wire 43, which energizes the magnet to move the core 44 in the direction of the arrow, Figure 6.

The core 44 is connected to a rocking lever 45 which throws out clutch 20. The clutch is held disengaged until the cable is returned to the reel as heretofore described. If desired similar means may be used to operate the pawl, etc.

From the above description it will be apparent that I have produced a construction embodying all of the features of advantage set forth as desirable, and while I have described and illustrated the preferred embodiment, I reserve the right to all changes within the spirit and scope of the appended claims.

I claim:

1. A parking timing meter, comprising a housing, a reel journaled in the housing, a flexible cable normally wound on the reel and having its free end accessible for manual unwinding of the cable, a spring-driven clock timing shaft, a gear train enmeshing the reel and timing shaft, a clutch in said gear train normally enmeshing the reel and timing shaft and declutching the parts when the cable has been unwound a predetermined distance to release the clock timing shaft for timing operation, and a stop on the cable to return the timing shaft to initial position upon the rewinding of the cable.

2. A parking timing meter, comprising a housing, a reel journaled in the housing, a flexible cable normally wound on the reel and having its free end accessible for manual unwinding of the cable, a spring-driven clock timing shaft, a gear train enmeshing the reel and timing shaft, a clutch in said gear train normally enmeshing the reel and timing shaft and declutching the parts when the cable has been unwound a predetermined distance to release the clock timing shaft for timing operation, a lever normally latching the gear train against movement, and coin-actuated means to operate the lever to free the gear train.

3. A parking timing meter, comprising a housing, a reel journaled in the housing, a flexible cable normally wound on the reel and having its free end accessible for manual unwinding of the cable, a spring-driven clock timing shaft, a gear train enmeshing the reel and timing shaft, a clutch in said gear train normally enmeshing the reel and timing shaft and declutching the parts when the cable has been unwound a predetermined distance to release the clock timing shaft for timing operation, a stop on the cable to return the timing shaft to initial position upon rewinding of the cable, a lever normally latching the gear train against movement, and coin-actuated means to operate the lever to free the gear train.

References Cited in the file of this patent

UNITED STATES PATENTS

| | | |
|---|---|---|
| 2,159,004 | Bosch | May 23, 1939 |
| 2,351,675 | Gengler | June 20, 1944 |
| 2,451,163 | Goin | Oct. 12, 1948 |
| 2,525,464 | Springer | Oct. 10, 1950 |
| 2,535,472 | Wood | Dec. 26, 1950 |